United States Patent [19]
Schuchardt

[11] Patent Number: 6,033,103
[45] Date of Patent: Mar. 7, 2000

[54] MIXING DEVICE

[75] Inventor: Heinrich Schuchardt, Leverkusen, Germany

[73] Assignee: Bayer Aktiengesellschaft, Leverkusen, Germany

[21] Appl. No.: 09/181,893

[22] Filed: Oct. 29, 1998

[30] Foreign Application Priority Data

Nov. 24, 1997 [DE] Germany .......................... 197 51 730

[51] Int. Cl.$^7$ ...................................................... B29B 7/48
[52] U.S. Cl. ............................ 366/97; 366/316; 366/301
[58] Field of Search ............................... 366/97, 96, 315, 366/316, 297, 300, 301

[56] References Cited

U.S. PATENT DOCUMENTS

| | | | |
|---|---|---|---|
| 2,631,016 | 3/1953 | Karaffe De Laubarede | 366/297 |
| 2,670,188 | 2/1954 | Erdmenger | 366/97 |
| 3,498,762 | 3/1970 | Van Der Schee et al. | 366/301 |
| 3,640,509 | 2/1972 | Inamura et al. | 366/301 |
| 4,004,785 | 1/1977 | Kajimoto et al. | 366/301 |
| 4,352,568 | 10/1982 | Lohr et al. | 366/297 |
| 5,304,000 | 4/1994 | Kowalczyk et al. | 366/97 |
| 5,334,358 | 8/1994 | Schuchardt et al. | 422/210 |
| 5,399,012 | 3/1995 | Schuchardt et al. | 366/97 |

FOREIGN PATENT DOCUMENTS

| | | |
|---|---|---|
| 0320586 | 6/1989 | European Pat. Off. . |
| 0715881A3 | 6/1996 | European Pat. Off. . |
| 1745541 | 6/1970 | Germany . |

*Primary Examiner*—Tony G. Soohoo
*Attorney, Agent, or Firm*—Sprung Kramer Schaefer & Briscol

[57] ABSTRACT

A mixing device for the treatment of viscous substances is described, which mixing device comprises a heatable container 1 with product inlet 5 on the one side of the container and product outlet 6 on the other side of the container, and where appropriate a vapor connection 7, which mixing device comprises a plurality of shafts 2,2' rotating in the same direction. Annular discs 4 are fitted to a shaft 2 by means of spokes 3; in this case, the annular discs 4 are corrugated in the axial direction, and annular discs 4 and spokes 3, together with the shaft 2 carrying them, kinematically clean the annular discs 4', spokes 3' and the adjacent shaft 2' carrying the latter. At all times, the housing 1 is kinematically cleaned by the annular discs 4,4' and spokes 3,3' in the course of rotation of the shafts 2,2'.

8 Claims, 9 Drawing Sheets

MIXING DEVICE

The invention relates to a mixing device for the treatment of viscous substances, comprising a heatable container with a product inlet on the one side of the container and product outlet on the other side of the container, where appropriate a vapour connection as well as two or more mutually parallel shafts which rotate in the same direction and to which annular discs are fitted by means of spokes, the annular discs being designed to be corrugated in the axial direction and annular discs and spokes together with the shaft carrying them kinematically cleaning the annular discs and spokes as well as the respectively adjacent shaft carrying the latter and the housing being kinematically cleaned by the annular discs and spokes in the course of rotation of the shafts.

In the production and processing of plastics and rubber, it is necessary for highly viscous liquids, which possibly contain finely divided solid substances, to be treated in terms of process engineering. In particular, devices for mixing, evaporation and reaction of plastics are required. These mixers or reactors must have a good mixing action, and, for example in the case of evaporation of volatile components as a consequence of release due to reaction, must also permit a rapid restoration of the free surfaces of the mixer.

For such process steps, which are determined by the material exchange between a liquid phase and the gas phase, the product of the interface between these two phases and the material transfer coefficient determines the rate.

In the case of the material exchange between gas phase and highly viscous liquids, the material transfer coefficient is essentially controlled by the frequency of restoration of the liquid surface.

The restoration of the liquid surface can take place by various mechanisms, e.g. by spreading out the liquid on a solid surface, e.g. a housing wall as described in U.S. Pat. No. 5,399,012 or by the flowing of liquid in freely falling films as in the case of the device shown in German 'OffenlegungsSchrift' DE-1 745 541.

The generation and restoration of the liquid surface by the formation of free liquid films is advantageous, since on the one hand the expenditure on apparatus for the restoration of the surface remains small and, on the other hand, little mechanical energy has to be introduced into the liquid.

In the case of procedures such as evaporation of solvents and polycondensation reactions with the release of volatile products, which take place at high temperature, decisive importance is ascribed to the dwell time of the liquid to be treated. Where the material to be mixed dwells for a very great length of time, there take place on a preferential basis secondary reactions, e.g. thermal breakdown of polymers in the case of polycondensation reactions, which impair the quality of the resulting product. In particular in the case of the treatment of highly viscous material to be mixed, there is accordingly frequently a desire for kinematic self-cleaning of the inner surface of the reactors which are used. This requirement is described, for example, in European published specification EP-0 320 586 A1.

The specification EP-0 320 586 A1 shows an example of a mixing apparatus in which an attempt is made to achieve both objectives, namely the generation and renovation of liquid surfaces by film formation and the self-cleaning of the inner surfaces of the apparatus. Upon precise consideration, it does however become noticeable that both on the housing inner wall and also on the ram and stripping elements, secured on the housing side, of the described mixing apparatus and also on the rotors, specific segments of the surface remain uncleaned.

The object of the invention is to provide a device which cleans itself kinematically and which effects the constant restoration of the liquid surface of the material to be mixed for material exchange with the gas phase by formation of freely falling liquid films.

According to the invention, this object is achieved by a mixing device for the treatment of viscous material to be mixed, comprising a container with a product inlet and a product outlet, where appropriate a vapour connection, two or more shafts, to which annular discs are fitted by means of spokes, having a drive means for the rotation of adjacent shafts in the same direction, the device being characterized in that the annular discs are formed to be corrugated in the direction of the axis of rotation of the shafts, in that annular discs and spokes together with the shaft carrying them are designed in such a way that they sweep over the surfaces of the spokes, annular discs and the respectively adjacent shaft carrying the latter in the course of the rotation of the shafts which is caused by the drive means, with the exception of the respectively end-located annular discs, seen in the direction of the axis of rotation, and in that the annular discs at their periphery sweep over the housing inner wall. For the purposes of the description which follows, for the sake of simplicity the entirety of shaft and spokes and annular discs connected to the shaft is designated as a rotor.

A particular advantage of the novel mixing device is its kinematic self-cleaning. In this instance, kinematic cleaning is understood as referring to the sweeping over of surfaces of a part of the device by the edges or surfaces of another part of the device; in this case, to prevent the blocking of moving parts, a play of the moving parts which is obtainable with due consideration being given to the production tolerance is permitted.

In a preferred embodiment of the invention, the spokes of a shaft are connected in each instance to the corrugated annular disc at a place where the annular discs, seen in the direction of the axis of rotation of the shaft, are most strongly bulged out.

A preferred variant of the device is provided with a drive means for the rotation of adjacent shafts which is equally rapid in terms of magnitude. As a result of this, it becomes possible to equip adjacent shafts with the same time of annular discs and spokes, whereby the manufacturing expenditure for the device is reduced.

In a further variant of the device, all spokes on a shaft are designed to be inclined in the same direction relative to the vertical to the axis of rotation of the shaft.

In order to reduce the friction in the gaps between the annular discs and the housing inner wall in the course of the cleaning of the wall of the housing, in a further advantageous embodiment of the device the annular discs carry on a part of their periphery an additional comb which cleans the housing wall. The combs are in particular disposed in such a way that an action along the axis of rotation of the shafts which promotes the rotation of the shafts is the result.

Preferably, the inlet and outlet for the material to be mixed are fitted at different ends of the mixing device, seen in the axial direction.

In a preferred further variant, the combs for conveying the material to be mixed are disposed on that part of the periphery of the annular discs which has a helical pitch with the same sign (corresponding to a left-hand or right-hand thread) with respect to the axis of rotation.

With the same axial spacing of the shafts, the cross section of the spokes and annular discs becomes the thinner, the more strongly the annular discs are axially corrugated. Accordingly, an embodiment of the device is particularly preferred in which the axial extent of the corrugated annular discs is at least four times as great as the maximum axial extent of the annular discs in a geometric meridian section or, expressed using different words, which is four times as great as the width of the annular discs in the axial direction.

The geometric prerequisites for the mutual cleaning of surfaces and edges of two rotors, rotating equally rapidly and in the same direction, of a mixing device are described in U.S. Pat. No. 5,334,358. Mutual cleaning is possible if, in a radial cross section, the sum or the difference of the radii of curvature at the contact point is equal to the axial spacing.

In the general case, the radial cross section of a surface which is cleaned by an edge is an epicycloid. A mathematical description can be found in European published specification EP-0 715 881 A2.

In the examples which follow, only mixing devices with play-free geometry are described. Of course, to avoid jamming of the rotors against one another or against the housing, plays are necessary. However, a geometry involving play may be obtained in a simple manner from a play-free geometry. In such a case, it is only necessary for the annular discs and spokes to be axially drawn apart in correspondence with the desired play. The shaft must be designed to be thinner by the amount of the desired play, and the housing inner space must be designed to be larger by the desired play.

If all annular discs and spokes are designed in identical fashion, the respective end-located final annular disc, seen in the axial direction, cannot be cleaned with its spokes on the side facing the housing end surface. Cleaning is possible only if this annular disc is designed with its spokes on the housing side as a surface of rotation which closely adjoins the housing wall.

Cleaning of the end faces of the housing is always possible if these are designed, in the region of influence of each shaft, in each instance as a surface of rotation which is swept over in each instance by the edge of a spoke.

In order to obtain a larger heating or cooling surface, not only the housing but also the shafts or even possibly in addition the spokes and annular discs of the rotors can be heated or cooled. This is, for example, possible as a result of the fitting of a system of internal heat carrier channels which permeate the shafts and possibly spokes and annular discs of the mixer and through which a heat carrier medium flows.

The mixing device is suitable for the mixing of, in particular, sensitive material to be mixed of all types, i.e. both for the mixing of liquid chemicals or natural substances which may possibly contain solids, and in particular as reactor for any chemical reactions, in which a matter of importance is restoration of the liquid surfaces. The mixer is particularly suitable as reactor for reactions involving the release of volatile substances, e.g. for polycondensation reactions and for drying and evaporation processes. The mixer can also be coupled in any selectable fashion with mixing, conveying and kneading devices which are in principle known, e.g. with screw conveyors.

In the text which follows, the invention is explained in greater detail by way of example with reference to the figures, without the invention being restricted in detail thereby.

FIG. 5b shows a side elevation of the rotor system corresponding to FIG. 5a.

EXAMPLES

Figure 1A:
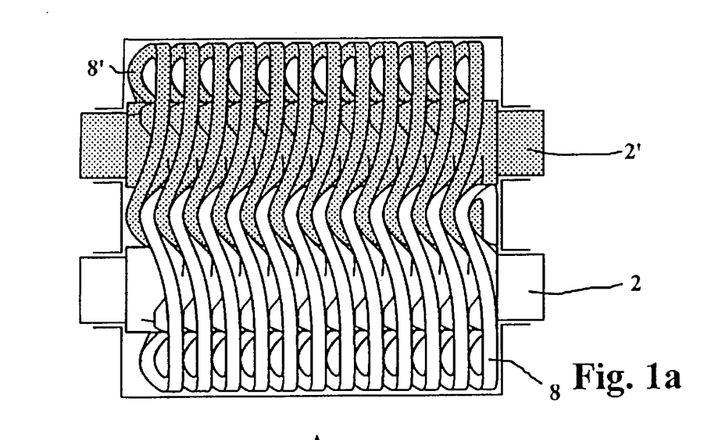
FIG. 1a shows a simplified representation of a mixer according to the invention, with the housing opened, in plan view onto the rotors.
Figure 1B:
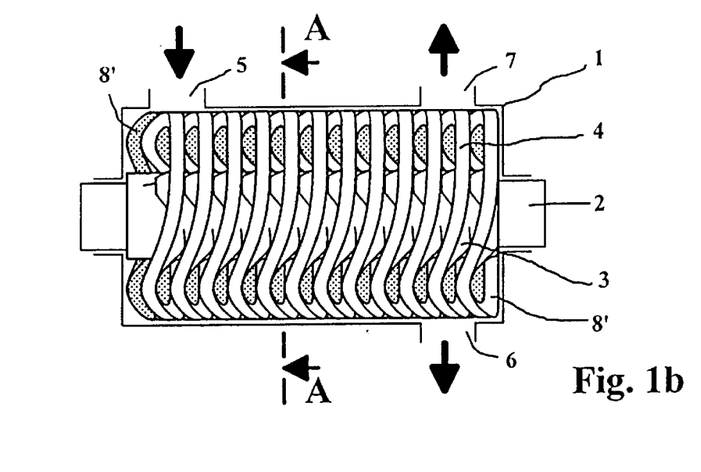
FIG. 1b shows a side elevation of the rotors of the mixer according to FIG. 1a, with the housing opened.
Figure 1C:
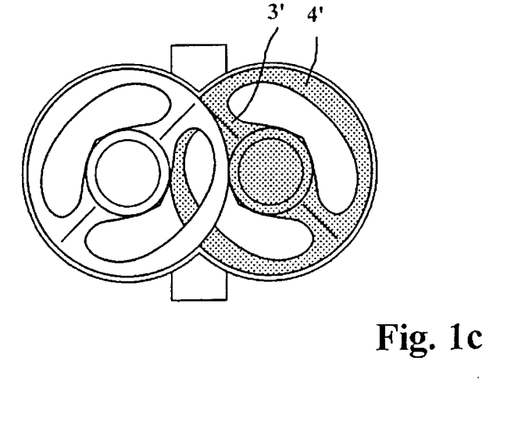
FIG. 1c shows a front elevation of the rotors of the mixer according to FIG. 1a, with the housing opened.

FIGS. 1a–c show the basic construction of a mixer according to the invention, comprising a possibly heatable housing 1 with a product inlet 5 on the one and a product outlet 6 on the opposite side and two shafts 2,2', which rotate in the same direction and to which annular discs 4,4' are fitted by means of spokes 3,3'. The vapour from the material to be mixed (not shown) can be drawn off via the connections 7. FIGS. 1a and 1c make clear the mutual interaction of the annular discs 4 and 4'.

Example 1

Figure 2:
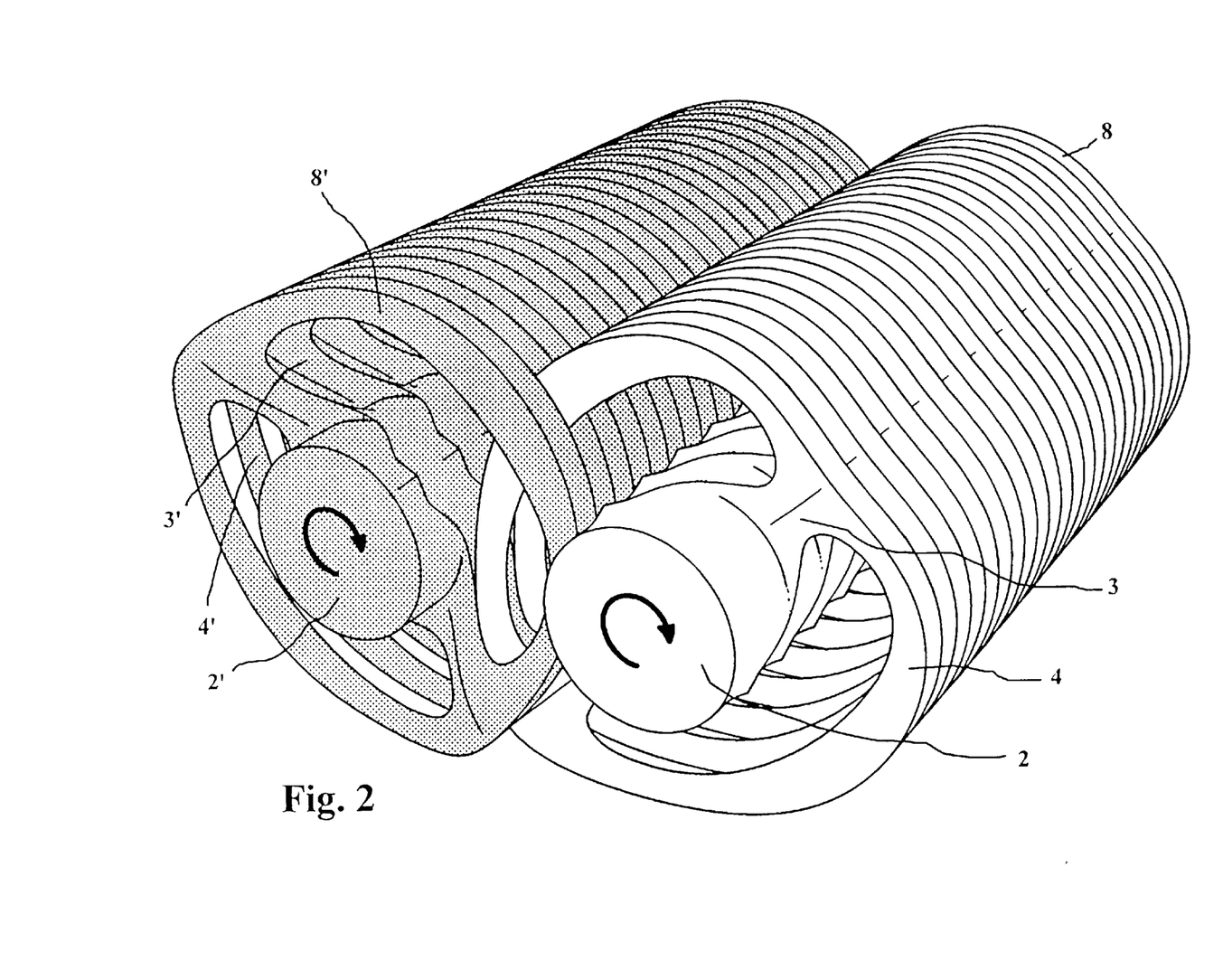
FIG. 2 shows a perspective representation of the rotors of a mixer/reactor according to the invention.

FIG. 2 shows, in a perspective view, the rotors of the mixer, comprising two shafts 2,2' which rotate in the same direction and to which annular discs 4,4' are fitted by means of spokes 3,3'.

The spokes 3,3' are all inclined with their outer ends, in accordance with one of the preferred embodiments, in an axial direction (towards the observer).

To describe the geometry of the mixer shown here, it is possible to use a co-ordinate system which is made with the axial spacing dimensionless:

The shafts 2 and 2' rotate equally rapidly in opposite directions, about the axes $$\begin{pmatrix} x \\ y \end{pmatrix} = \begin{pmatrix} \pm 0.5 \\ 0 \end{pmatrix}.$$

The edges of the annular discs were selected as follows:

$$x = \sqrt{\frac{1}{2}} \cos\left(\frac{\pi}{2}(t + x_0)\right) + x_0$$

-continued $$y = \sqrt{\frac{1}{2}} \sin\left(\frac{\pi}{2}(t+x_0)\right)$$

$$z = 0.1 \cdot (4t^6 - 6t^4 + 1) + 0.1 \cdot x_0 + 0.2 \cdot i \pm 0.05, \text{ for } t < 1$$

$$z = 0.1 \cdot (4(t-2)^6 - 6(t-2)^4 + 1) + 0.1 \cdot x_0 + 0.2 \cdot i \pm 0.05, \text{ for } t \geq 1$$

with t from [−1; 3] and $x_0 = \pm 0.5$ i is a counter for the number of annular discs on a shaft.

The front and rear edges 9, 10 of the annular disc are connected by a cylindrical surface which cleans itself together with the housing inner wall 11.

The annular disc edges sweep over the spoke surfaces. The inner ring surfaces are swept over by spoke and ring edges.

The geometric design is implemented in each instance in radial cross section. If a surface of a rotor element is to be cleaned by an edge of an adjacent rotor element, its radius of curvature must, in radial cross section, be equal to the axial spacing of the adjacent rotors. Where two surfaces of adjacent rotors clean each other, the sum or the difference of their radii must be equal to the axial spacing.

Figure 3:
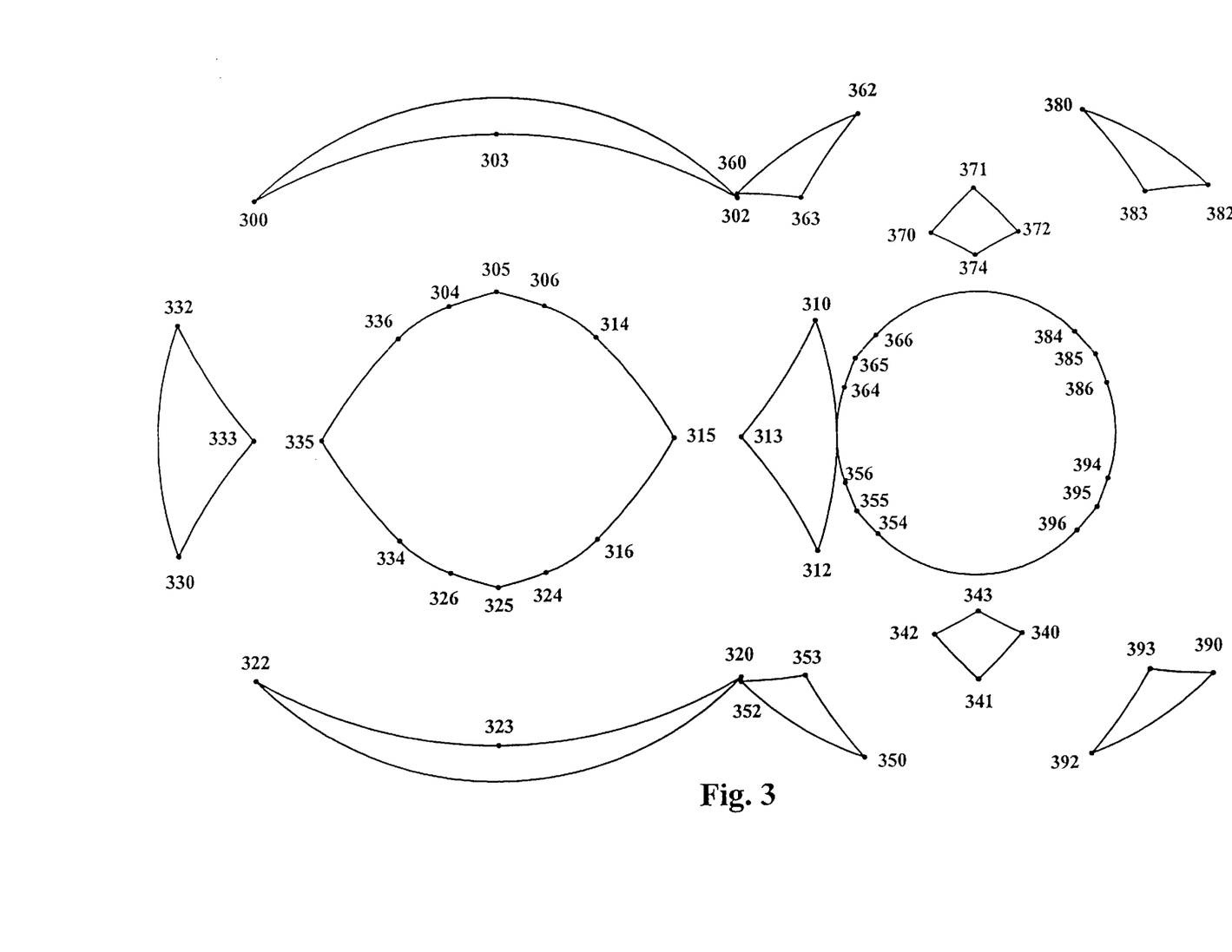
FIG. 3 shows a radial cross section through the rotors according to FIG. 2 in accordance with a cross section corresponding to the line A-A' in FIG. 1b.

The mutual complete cleaning of two rotors may be explained by reference to the radial cross section through the rotors derived from FIG. 2 in accordance with the cross section corresponding to line A-A' in FIG. 1b, to the form in which this cross section is shown in FIG. 3:

The housing cleans the surfaces 300–302, 310–312, 320–322, 330–332, 350–352, 360–362, 380–382, 390–392.

| | | |
|---|---|---|
| The surface 302-303-300 | is cleaned by | the edge 343. |
| The surface 312-313 | is cleaned by | the edge 350. |
| The surface 313-310 | is cleaned by | the edge 362. |
| The surface 322-323-320 | is cleaned by | the edge 374. |
| The surface 333-330 | is cleaned by | the edge 392. |
| The surface 332-333 | is cleaned by | the edge 380. |
| The surface 304-305 | is cleaned by | the edge 392.. |
| The surface 305-306 | is cleaned by | the edge 350. |
| The surface 306-314 | is cleaned by | the surface 350-352. |
| The surface 314-315 | is cleaned by | the edge 320. |
| The surface 315-316 | is cleaned by | the edge 360. |
| The surface 316-324 | is cleaned by | the surface 360-362. |
| The surface 324-325 | is cleaned by | the edge 362. |
| The surface 325-326 | is cleaned by | the edge 380. |
| The surface 326-334 | is cleaned by | the surface 380-382. |
| The surface 334-335 | is cleaned by | the edge 382. |
| The surface 335-336 | is cleaned by | the edge 390. |
| The surface 336-304 | is cleaned by | the surface 390-392. |
| The surface 343-340 | is cleaned by | the edge 300. |
| The surface 342-343 | is cleaned by | the edge 302. |
| The surface 340-341 | is cleaned by | the edge 332. |
| The sutface 341-342 | js cleaned by | the edge 310. |
| The surface 352-353 | is cleaned by | the edge 300. |
| The surface 353-350 | is cleaned by | the edge 313. |
| The surface 362-363 | is cleaned by | the edge 313. |
| The surface 363-360 | is cleaned by | the edge 322. |
| The surface 370-371 | is cleaned by | the edge 312. |
| The surface 311-372 | is cleaned by | the edge 330. |
| The surface 372-374 | is cleaned by | the edge 320. |
| The surface 374-370 | is cleaned by | the edge 322. |
| The surface 382-383 | is cleaned by | the edge 320. |
| The surface 383-380 | is cleaned by | the edge 333. |
| The surface 392-393 | is cleaned by | the edge 333. |
| The surface 393-390 | is cleaned by | the edge 302. |

Figure 4:
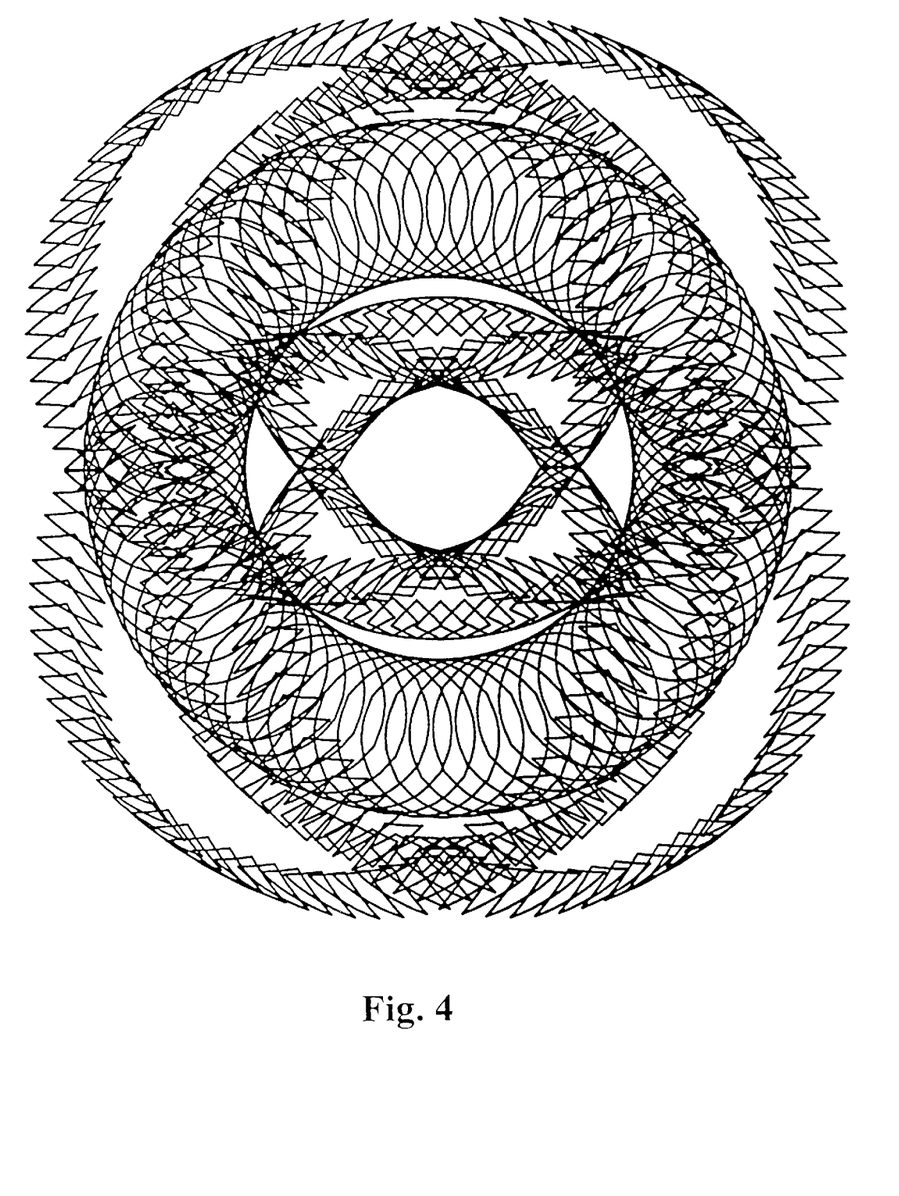
FIG. 4 shows a radial cross section as in FIG. 3, but in superposed instantaneous views. In this case, the left-hand rotor (2', 3', 4') has been arrested and the relative movement of the adjacent right-hand rotor (2, 3, 4) has been shown in the course of a complete rotation.

The fact that all surfaces are cleaned during a rotation of the shafts also becomes evident from FIG. 4. In this figure, the same somewhat reduced radial cross section as in FIG. 3 is shown, but the left-hand rotor (300–336) has been arrested and the respective relative movement of the right-hand rotor (350–396) has been shown in various instantaneous views in the course of a complete rotation.

In the figures only in each case one play-free geometry is shown. Of course, to avoid jamming of the rotors against one another and against the housing, plays are necessary. However, a geometry involving play may be obtained in a simple manner from a play-free geometry. The annular discs 4,4' and spokes 3,3' derived from the example merely need to be drawn apart axially in correspondence with the play s. The shaft must be designed to be thinner by the play, and the housing to be larger by the play.

The edges of the annular discs 4,4' are then obtained as follows:

$$x = \sqrt{\frac{1}{2}} \cos\left(\frac{\pi}{2}(t+x_0)\right) + x_0$$

$$y = \sqrt{\frac{1}{2}} \sin\left(\frac{\pi}{2}(t+x_0)\right)$$

$$z = 0.1 \cdot (4t^6 - 6t^4 + 1) + 0.1 \cdot x_0 + (0.2 + 2s) \cdot i \pm 0.05, \text{ for } t < 1$$

$$z = 0.1 \cdot (4(t-2)^6 - 6(t-2)^4 + 1) + 0.1 \cdot x_0 + (0.2 + 2s) \cdot i \pm 0.05, \text{ for } t \geq 1$$

with t from [−1; 3] and $x_0 = \pm 0.5$.

Since the lateral surfaces of the annular discs and of the spokes do not stand perpendicular to the axis of rotation, there is however at these a play which is somewhat smaller than s.

However, an equidistant play s is also attainable:

To this end, the surfaces of spokes and annular discs are generated by imaginary spheres of radius s, which are then trained by the points (x, y, z) of the edges of the annular discs and of the spokes respectively.

Example 2

Figure 5A:
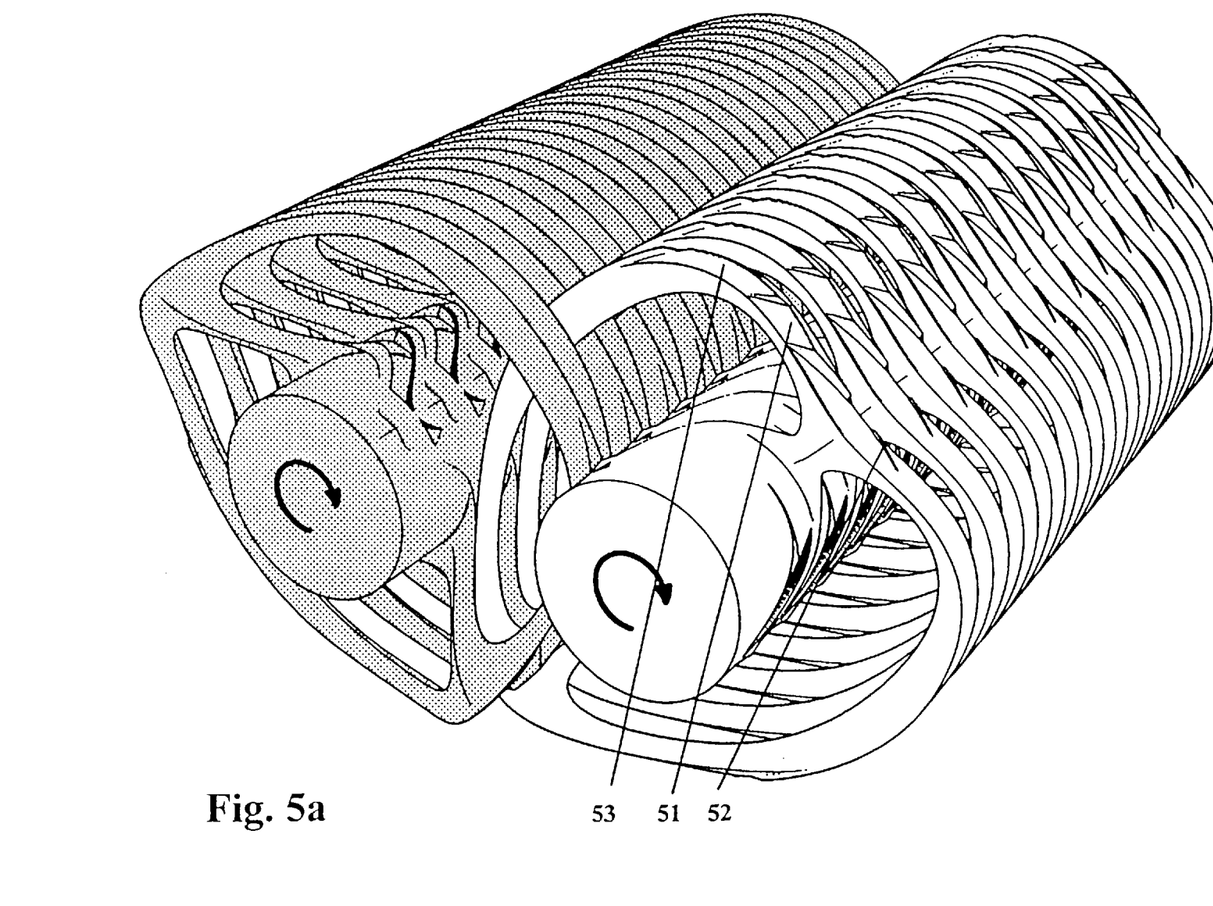
FIG. 5a shows a perspective representation of the rotors of a variant of the device according to the invention, in which in each instance combs for cleaning the outer wall of the housing have been fitted to the outer surfaces of the rings.
Figure 5B:
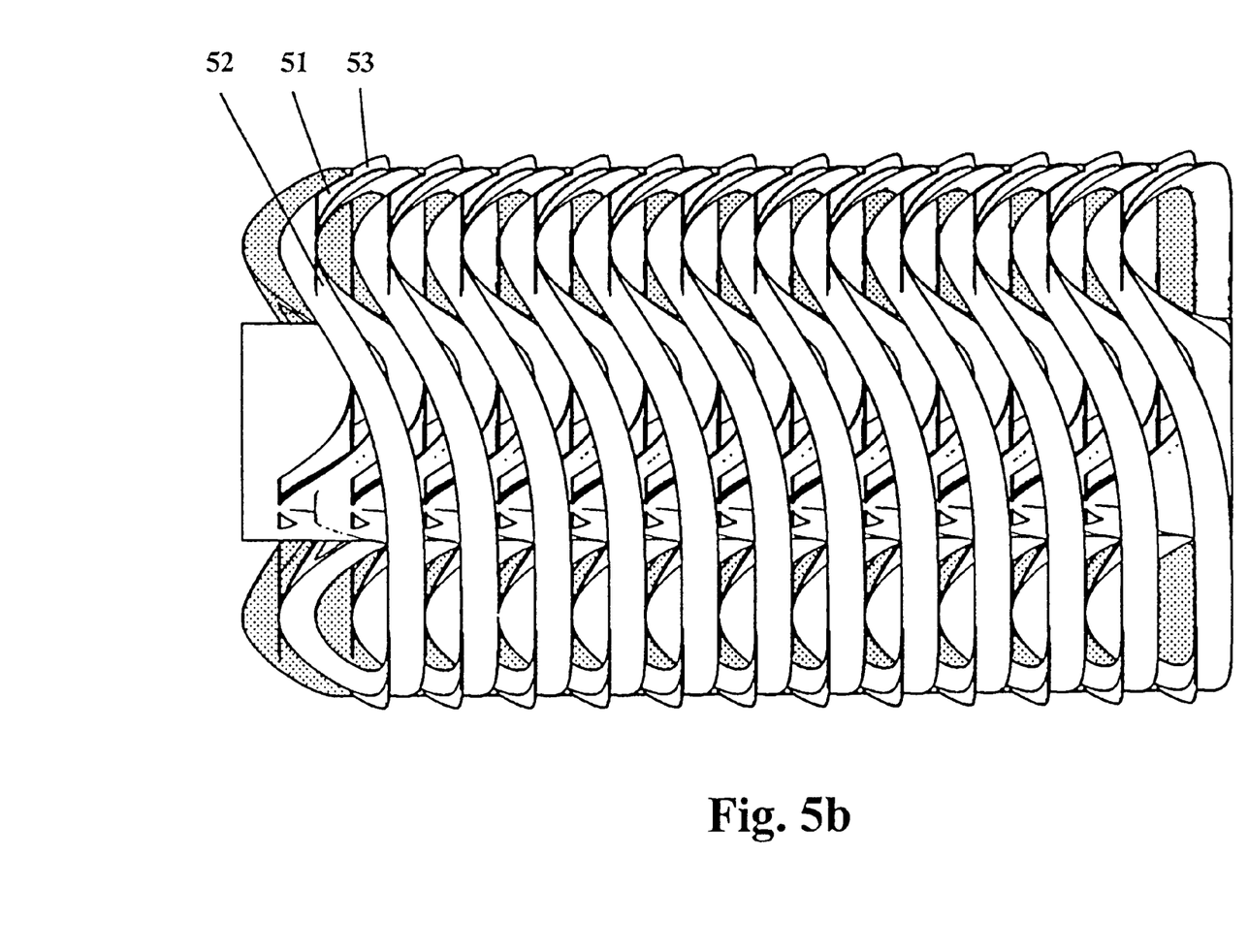

FIGS. 5a and 5b show the rotors of a variant of the device according to the invention. As compared with the device according to FIG. 2, the annular discs 4, 4' are more strongly axially corrugated. While in Example 1 the entire outer surface of the annular discs is at all times in contact with the housing and as a result thereof may lead to high frictional losses, in this example a comb 51, 53 has been disposed on a part of the periphery of said surface, which comb cleans the housing 1. In this case, the position of the comb 51, 53 was chosen in such a way that in the course of rotation of the shafts an axial conveying action takes place. If the mutual cleaning of the annular discs with the adjacent shaft is desired, then shallower combs 52 are obligatorily necessary also at other positions of the annular disc. However, these do not reach the housing.

In the course of rotation of the shafts in the direction shown in FIG. 5a, the combs cleaning the housing convey away from the observer. FIG. 5b makes clear the seating of the combs 51, 53 and 52.

Figure 6:
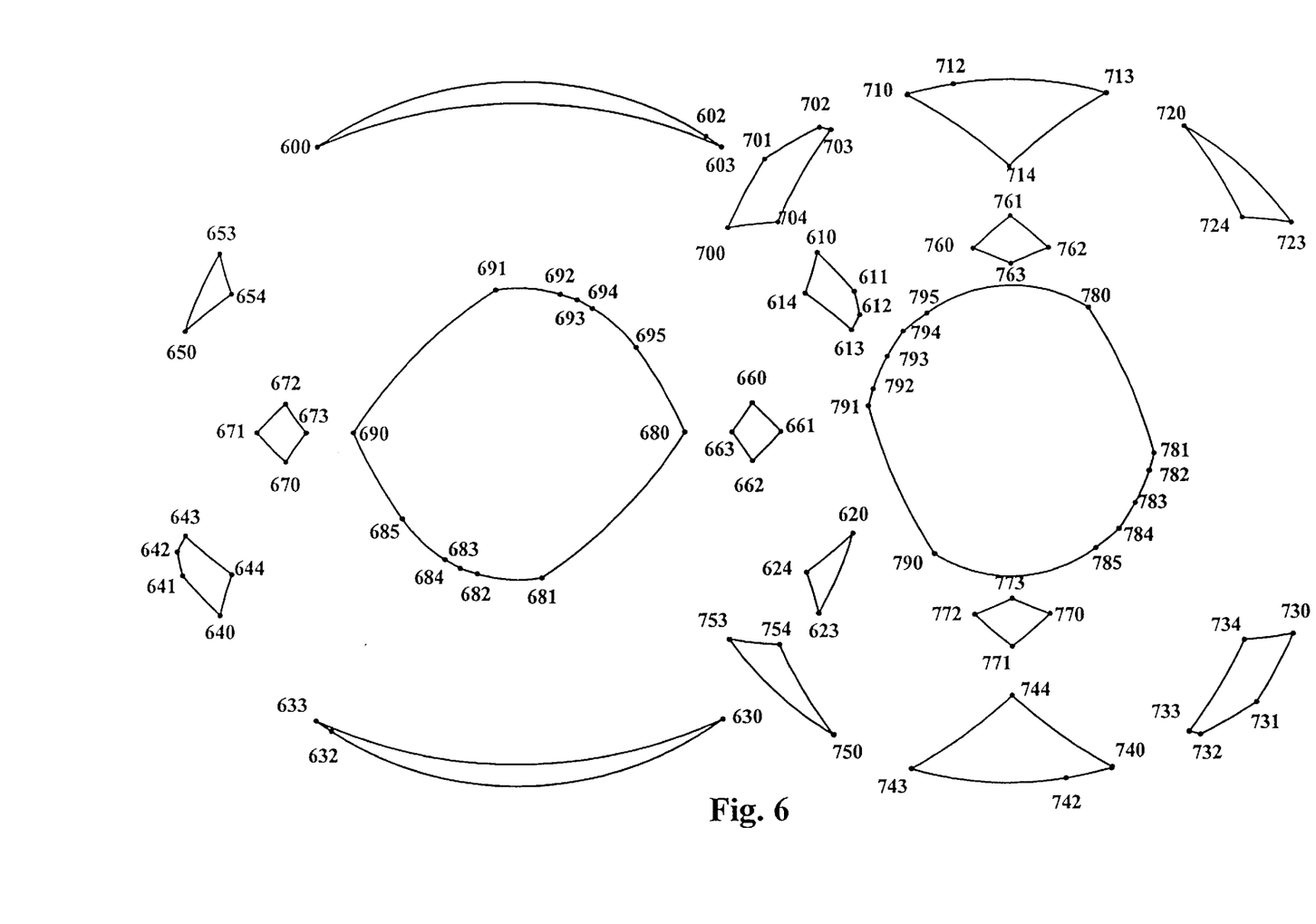
FIG. 6 shows a radial cross section through the rotors according to FIG. 5a in accordance with a cross section corresponding to line A-A' in FIG. 1b.

FIG. 6 shows a radial cross section through the rotors according to FIG. 5 in accordance with the cross section corresponding to line A-A' derived from FIG. 1b. In this case, the comb 51 is recognizable as edges 611, 641, 701, 731. The slight humps in the radial direction of the surfaces 602–603, 632–633, 710–712, 740–742 correspond to the subsidiary combs 52.

To describe the geometry of this mixer, it is possible to use a co-ordinate system which is made with the axial spacing dimensionless:

The rotors rotate equally rapidly, in opposite directions, about the axes $$\begin{pmatrix} x \\ y \end{pmatrix} = \begin{pmatrix} \pm 0.5 \\ 0 \end{pmatrix}.$$

The edges of the annular discs were selected as follows:

$$x = \sqrt{\frac{1}{2}} \cos\left(\frac{\pi}{2}(t + x_0)\right) + x_0$$

$$y = \sqrt{\frac{1}{2}} \sin\left(\frac{\pi}{2}(t + x_0)\right)$$

$$z = 0.15 \cdot (4t^6 - 6t^4 + 1) + 0.1 \cdot x_0 + 0.2 \cdot i \pm 0.05, \text{ for } t < 1$$

$$z = 0.15 \cdot (4(t-2)^6 - 6(t-2)^4 + 1) + 0.1 \cdot x_0 + 0.2 \cdot i \pm 0.05, \text{ for } t \geq 1$$

with t from [−1; 3]

and $x_0 = \pm 0.5$.

i is a counter for the number of annular discs on a rotor.

The extent of the annular disc in a meridian section is obtained from the term ±0.05 in the equation for z at 0.1. For i=0 and $x_0=0.5$, the extreme values for z are obtained as $$z_{min, max} = \pm 0.2 + 0.05.$$

In corresponding fashion, the axial extent amounts to 0.4.

The axial extent of the corrugated annular discs is thus 4 times as great as the maximum axial extent of the annular discs in a meridian section.

The comb height is 0.035 times the axial spacing of the adjacent shafts.

The mutual cleaning of the rotor elements may be explained by reference to the radial cross section through the rotors derived from FIG. 5 in accordance with the cross section corresponding to line A-A' in FIG. 1 in the form in which that cross section is shown in FIG. 6:

| | | |
|---|---|---|
| The surface 600-602 | is cleaned by | the surface 790-785. |
| The surface 602-603 | is cleaned by | the edge 790. |
| The surface 603-600 | is cleaned by | the edge 773. |
| The surface 610-611 | is cleaned by | the edge 772. |
| The surface 611-612 | is cleaned by | the edge 791. |
| The surface 612-613 | is cleaned by | the edge 710. |
| The surface 613-614 | is cleaned by | the edge 744. |
| The surface 614-610 | is cleaned by | the edge 703. |
| The surface 660-661 | is cleaned by | the edge 743. |
| The surface 661-662 | is cleaned by | the edge 710. |
| The surface 662-663 | is cleaned by | the edge 750. |
| The surface 663-660 | is cleaned by | the edge 703. |
| The surface 620-623 | is cleaned by | the surface 792-793. |
| The surface 623-624 | is cleanedby | the edge 750. |
| The surface 624-620 | is cleaned by | the edge 750. |
| The surface 630-632 | is cleaned by | the surface 795-780. |
| The surface 632-633 | is cleaned by | the edge 780. |
| The surface 633-630 | is cleaned by | the edge 763. |
| The surface 640-641 | is cleaned by | the edge 780. |
| The surface 641-642 | is cleaned by | the edge 781. |
| The surface 642-643 | is cleaned by | the edge 740. |
| The surface 643-644 | is cleaned by | the edge 714. |
| The surface 644-640 | is cleaned by | the edge 733. |
| The surface 670-671 | is cleaned by | the edge 713. |
| The surface 671-672 | is cleaned by | the edge 740. |
| The surface 672-673 | is cleaned by | the edge 720. |
| The surface 673-670 | is cleaned by | the edge 733. |
| The surface 680-681 | is cleaned by | the edge 701. |
| The surface 681-682 | is cleaned by | the surface 712-713. |
| The surface 682-683 | is cleaned by | the edge 713. |
| The surface 683-684 | is cleaned by | the edge 720. |

-continued

| | | |
|---|---|---|
| The surface 684-685 | is cleaned by | the surface 720-723. |
| The surface 685-690 | is cleaned by | the edge 723. |
| The surface 690-691 | is cleaned by | the edge 731. |
| The surface 691-692 | is cleaned by | the surface 742-743. |
| The surface 692-693 | is cleaned by | the edge 743. |
| The surface 693-694 | is cleaned by | the edge 750. |
| The surface 694-695 | is cleaned by | the surface 750-753. |
| The surface 695-680 | is cleaned by | the edge 753. |

In corresponding fashion, the surfaces 700 et seq. are cleaned by the edges 600 et seq.

At the positions 603, 633, 710, 740, there are surfaces which are very narrow and therefore difficult to represent graphically and which are cleaned by the edges 700, 730, 613, 643.

Figure 7:
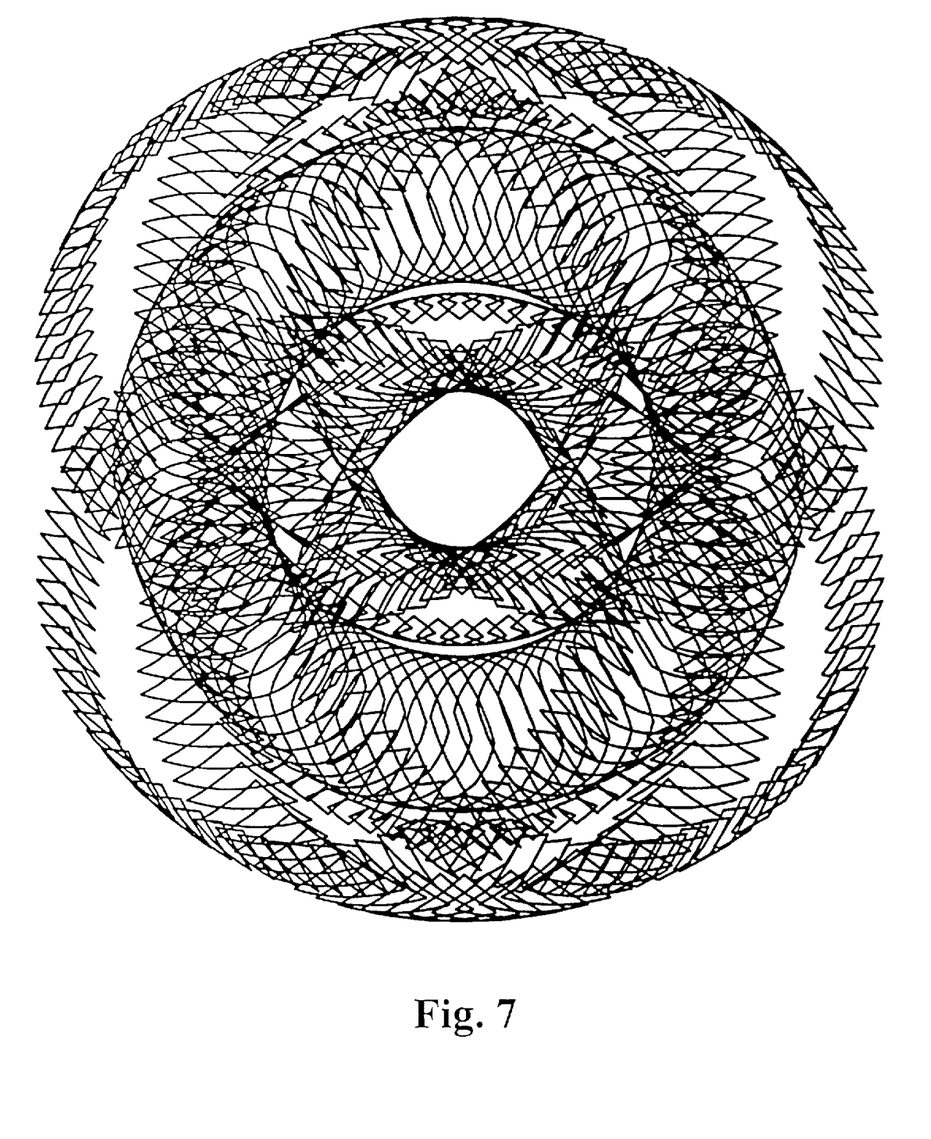
FIG. 7 shows a radial cross section as in FIG. 7, but in superposed instantaneous views. In this case, the left-hand rotor (2', 3', 4') has been arrested, and the relative movement of the adjacent right-hand rotor (2, 3, 4) has been shown in the course of a complete rotation.

The fact that all surfaces are cleaned also becomes evident from FIG. 7. In this case, the same type of radial cross section as in FIG. 3 is shown, but the left-hand rotor (600 et seq.) has been arrested and the respective position of the right-hand rotor (700 et seq.) has been shown during various instants of a complete rotation.

Figure 8:
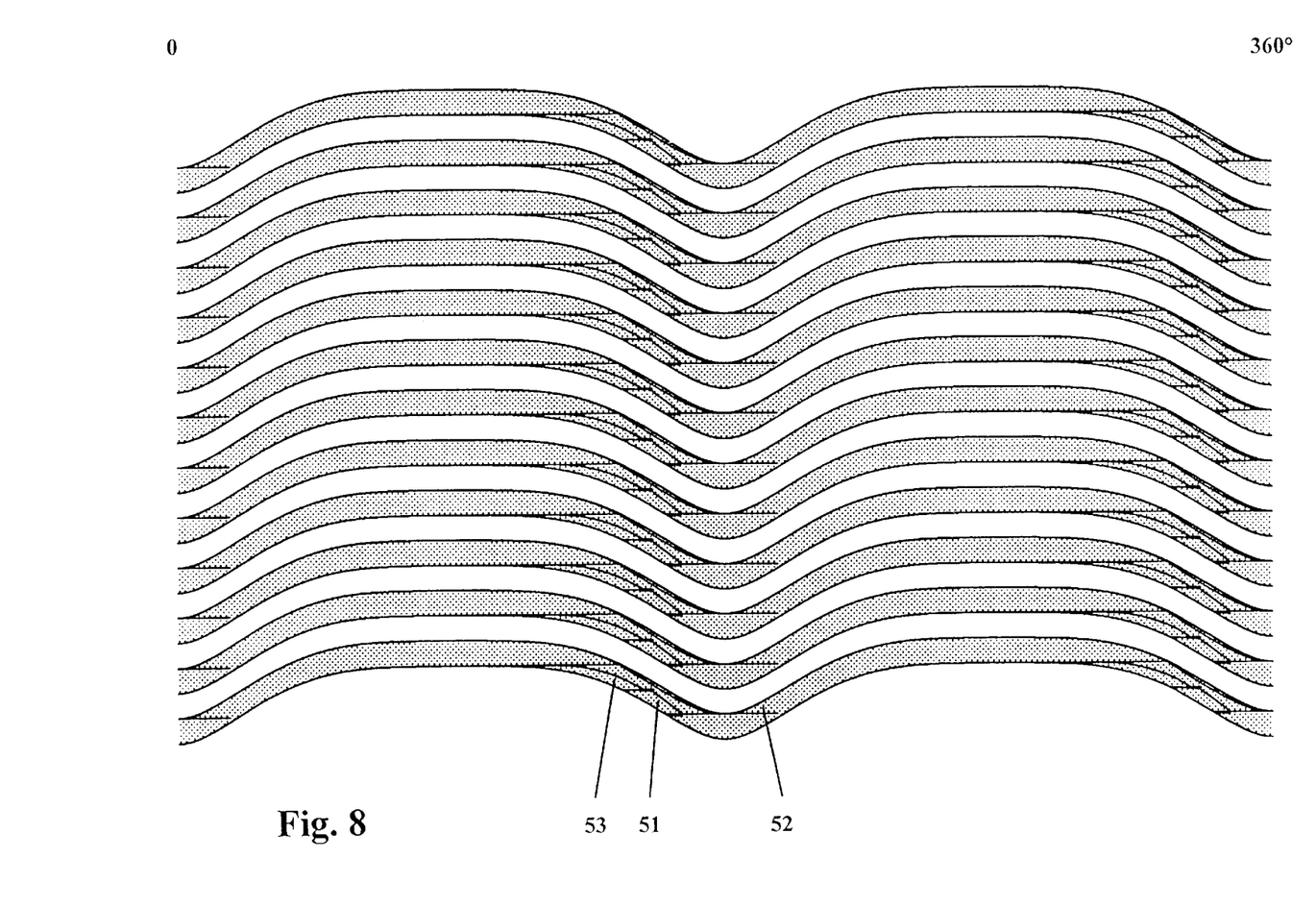
FIG. 8 shows a geometric developed view of the periphery of the rotors according to FIG. 5.

FIG. 8 shows a geometric developed view of the periphery of the annular discs 4' of one of the rotors 2', 3', 4' in accordance with FIGS. 5a or 5b. It is discerned from the figure that the combs 51, 53 and 52 are fitted only on a small part of the periphery of the annular discs. The combs 51, 53 which clean the housing 1 all have the same pitch direction (in this case, a left-hand thread). Accordingly, they enable axial conveying of the material to be mixed in the course of rotation of the shafts.

I claim:

1. Mixing device for the treatment of viscous material to be mixed, comprising a container (1) with a product inlet (5) and a product outlet (6), where appropriate a vapor connection (7), two or more shafts (2,2'), to which annular discs (4,4') are fitted by means of spokes (3,3'), having a drive means for the rotation in the same direction of adjacent shafts (2 and 2' respectively), wherein in that the annular discs (4,4') are formed to be corrugated in the direction of the axis of rotation of the shafts (2,2'), in that annular discs (4) and spokes (3) together with the shaft (2) carrying them are designed in such a way that they fully sweep over the surfaces of the spokes (3'), annular discs (4') and the respectively adjacent shaft (2') carrying them in the course of the rotation of the shafts (2,2') which is caused by the drive means, with the exception of the respective end-located annular discs (8, 8'), seen in the direction of the axis of rotation, and in that the annular discs (4,4') sweep on their periphery over the housing inner wall (9).

2. Device according to claim 1, wherein in that the spokes (3,3') are connected to the corrugated annular disc (4,4') in each instance at a position where the annular discs (4,4') are most strongly axially bulged out.

3. Device according to claim 1 wherein the shafts (2,2') are provided with a drive means for the rotation of adjacent shafts (2,2') which is equally rapid in terms of magnitude.

4. Device according to claim 1, wherein all spokes (3 and 3' respectively) on a shaft (2 and 2' respectively) are inclined in the same axial direction relative to the vertical to the axis of rotation of the shaft (2 and 2' respectively).

5. Device according to claim 1, wherein the annular discs (4,4') carry, on a part of their periphery, an additional comb (10) which sweeps over the housing inner wall (9) in the course of rotation of the shafts (2,2').

6. Device according to claim 1, wherein the comb (10) is disposed in such a way that, in the course of rotation of the shafts (2,2'), it has a conveying action along the axis of rotation of the shafts (2,2').

7. Device according to claim 6, wherein the combs (10) for conveying the material to be mixed are disposed on that part of the annular discs (4,4') which has a helical pitch with the same sign (left-hand thread or right-hand thread).

8. Device according to claim 1, wherein the axial extent of the corrugated annular discs (4,4') is at least four times as great as the maximum axial width of the annular discs (4,4') in a meridian section.

* * * * *